(12) United States Patent
Berry et al.

(10) Patent No.: US 7,406,604 B2
(45) Date of Patent: Jul. 29, 2008

(54) METHOD FOR PROTECTING A MEMORY CARD, AND A MEMORY CARD

(75) Inventors: Onni Michael Berry, Tampere (FI); Janne Honkala, Nokia (FI)

(73) Assignee: Spyder Navigations, L.L.C., Wilmington, DE (US)

( * ) Notice: Subject to any disclaimer, the term of this patent is extended or adjusted under 35 U.S.C. 154(b) by 852 days.

(21) Appl. No.: 09/850,580

(22) Filed: May 7, 2001

(65) Prior Publication Data
US 2001/0039620 A1 Nov. 8, 2001

(30) Foreign Application Priority Data
May 8, 2000 (FI) .................. 20001073

(51) Int. Cl.
G06F 12/14 (2006.01)
H04L 9/32 (2006.01)
(52) U.S. Cl. .................................... 713/193
(58) Field of Classification Search ........... 713/193; 380/270
See application file for complete search history.

(56) References Cited

U.S. PATENT DOCUMENTS 4,447,873 A * 5/1984 Price et al. .................. 710/53

(Continued)

FOREIGN PATENT DOCUMENTS

| EP | 0768601 A1 | 4/1997 |
|----|-----------|--------|
| EP | 0 840465 A2 | 6/1998 |
| EP | 0856818 A2 | 8/1998 |
| EP | 0977451 A2 | 2/2000 |

(Continued)

OTHER PUBLICATIONS

Patent Abstracts of Japan, Publication No. 11337349, Dec. 10, 1999, NEC Home Electron Ltd.

(Continued)

*Primary Examiner*—Kambiz Zand
*Assistant Examiner*—Aubrey H Wyszynski

(57) ABSTRACT

The invention relates to a memory card (2) which is arranged to be inserted in a memory card slot (4) of an electronic device (1), information being arranged to be stored in the memory (5) of the memory card (2). The information to be stored is at least partly arranged to be encrypted by means of a password, wherein this encrypted information is arranged to be stored in this encrypted format in the memory (5) of the memory card (2). The information to be read from the memory (5) of the memory card (2) is arranged to be retrieved at least partly in encrypted format from the memory (5) of the memory card (2), wherein the information to be retrieved is arranged to be decrypted by means of the password. The invention also relates to an electronic device (1) in which at least one memory card (2) is used for storing at least some information. This electronic device (1) is arranged at least partly to encrypt the information to be stored by means of a password and to store this encrypted information in this encrypted format into the memory (5) of the memory card (2). The electronic device (1) is arranged to retrieve the information to be read from the memory (5) of the memory card (2) at least partly in encrypted format and to decrypt the retrieved information by means of the password. The invention also relates to a method for protecting a memory card (2), in which method information is stored on the memory card (2) inserted in the memory card slot (4) of an electronic device (1).

31 Claims, 2 Drawing Sheets

U.S. PATENT DOCUMENTS

Figure 1:
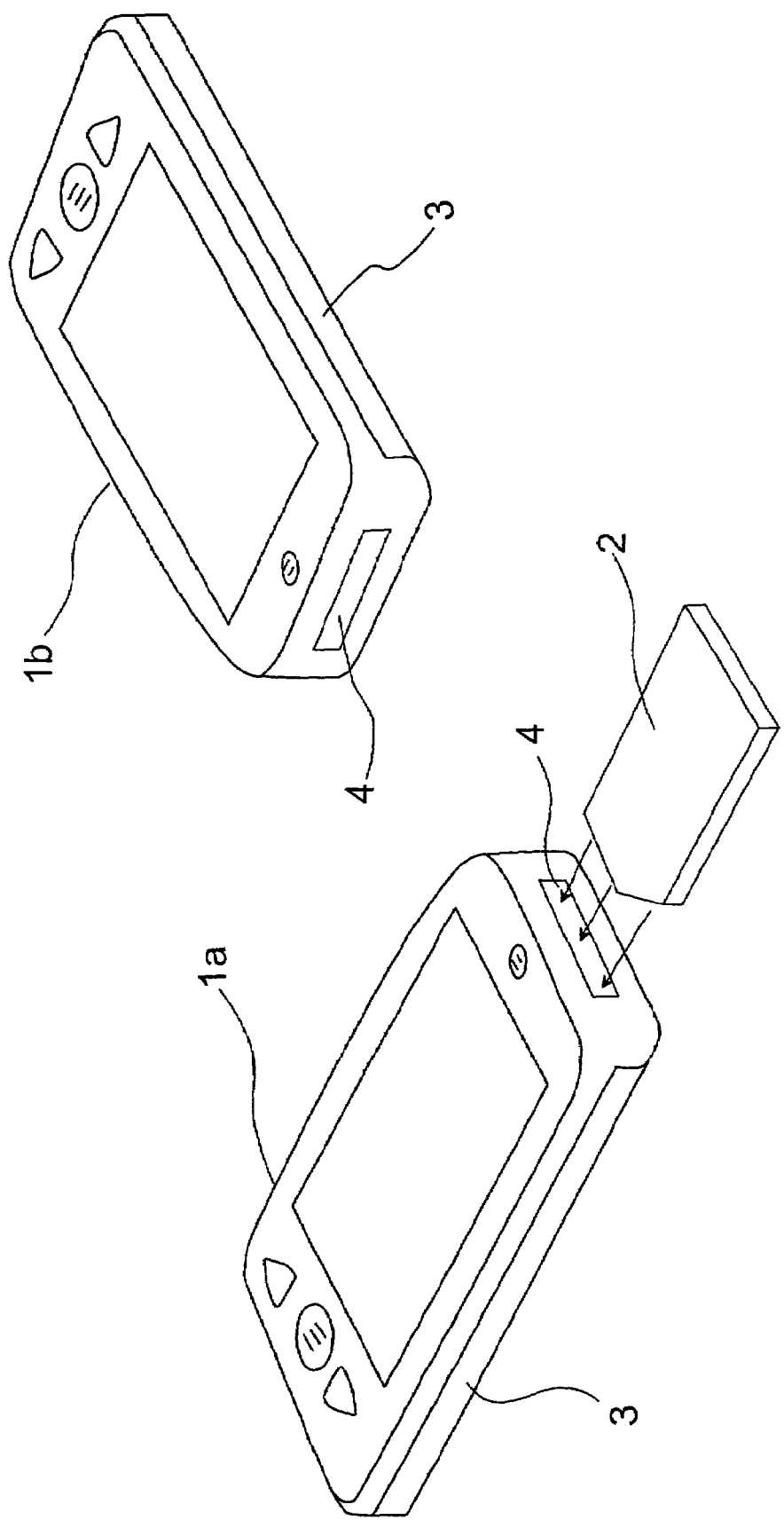

| | | | | |
|---|---|---|---|---|
| 4,672,182 A * | 6/1987 | Hirokawa | ................... | 235/436 |
| 5,081,675 A | 1/1992 | Kittirutsunetorn | ............. | 380/4 |
| 5,357,573 A | 10/1994 | Walters | ....................... | 380/25 |
| 5,590,193 A * | 12/1996 | Le Roux | .................... | 713/192 |
| 5,623,637 A | 4/1997 | Jones et al. | ................. | 395/491 |
| 5,845,066 A | 12/1998 | Fukuzumi | .................. | 395/186 |
| 5,889,866 A | 3/1999 | Cyras et al. | ................... | 380/49 |
| 5,950,013 A | 9/1999 | Yoshimura et al. | ........... | 395/825 |
| 6,079,019 A | 6/2000 | Fukuzumi | .................. | 713/193 |
| 6,707,915 B1 * | 3/2004 | Jobst et al. | ................. | 380/247 |
| 6,775,559 B1 * | 8/2004 | Weghorst et al. | ............ | 455/558 |

FOREIGN PATENT DOCUMENTS

| | | |
|---|---|---|
| WO | WO 95/16238 | 6/1995 |
| WO | WO 97/22092 | 6/1997 |
| WO | WO97/22092 | 6/1997 |
| WO | WO 97/29607 | 8/1997 |
| WO | WO 97/36426 | 10/1997 |

OTHER PUBLICATIONS

Patent Abstracts of Japan, Publication No. 20000250818, Sep. 14, 2000, Tokyo Electron Ltd.

Patent Abstracts of Japan, Publication No. 10124399, May 15, 1998, Mitsubishi Electric Corp.

* cited by examiner

METHOD FOR PROTECTING A MEMORY CARD, AND A MEMORY CARD

The present invention relates to a memory card according to the preamble of the appended claim 1. The invention also relates to an electronic device according to the preamble of the appended claim 7. Furthermore, the invention relates to a method according to the preamble of the appended claim 13.

For storing various information, devices are available according to prior art, such as notepad computers, small hand-held computers, PDA devices (Personal Digital Assistant) or comparable devices. These devices can be used for storing e.g. calendar data, notes, address data, telephone numbers, or corresponding information entered by the user. The data are normally entered in these devices by means of a keypad, but in some devices it is possible to store text data also by writing it directly on a touch screen e.g. by means of a pen-like object, or stylus. The performance of these devices is continuously increasing, and they already comprise several properties known from PC devices (Personal Computer). For some devices, there are expansion cards complying with the PCMCIA (Personal Computer Memory Card International Application) standard available, to couple these devices e.g. to mobile phones. Thus, for example PDA devices can be used to transmit and receive for example facsimile messages, short messages (SMS, Short Message Service) and other text files in a wireless manner by utilizing radio waves. In this specification, a PDA device refers to devices of the above-described art.

In a way known per se, there are also devices available, in which the functions of a wireless communication device and a PDA device are combined. One such known device is Nokia Communicator 9110, which can be used to communicate with the Internet network, to perform mobile phone functions, such as receiving a phone call and selecting a telephone number, and to receive e.g. facsimile messages. The properties of wireless communication devices, such as mobile phones, are continuously increasing, and they normally comprise functions e.g. for displaying images on the display of the wireless communication device. In this specification, a wireless communication device refers to such a wireless communication device which comprises functions of the above-described PDA device or a corresponding device.

In wireless communication devices of the above-described art, separate memory cards (multimedia memory card, MMC) are normally used for storing information. These memory cards can also be used to transmit information between two different wireless communication devices. However, it is normally impossible to encrypt or lock these memory cards in such a way that outsiders would not be able to process information contained in the memory card. For example, if the memory card is lost or stolen, the information contained in it can be read by an outsider with a device compatible with the memory card.

Patent application EP 856 818 A2 presents an encryption method for e.g. a smart card. In this case, the smart card contains a memory and an element for processing encryption as well as an element for encrypting/decrypting. This smart card operates in the following way. First, a data key entered e.g. by the user is retrieved and transmitted to the element for encrypting/decrypting. After this, the address is decrypted in the element for address decryption. If the operation in question is reading, encrypted information is retrieved from the memory, decrypted by using the data key, and transmitted to the bus in a decrypted format. If the operation in question is writing, information is retrieved from the bus, encrypted by using the data key and stored in the memory in encrypted format. If the operation in question is memory erasure, the memory is erased in the requested manner. The invention presented in this publication has the drawback that the memory card must contain an element for encrypting/decrypting, which increases the physical size and price of the memory card.

It is an aim of the present invention to provide a memory card and a method whereby memory cards can be protected from outsiders but in such a way that the protection can be removed from the memory card when desired, wherein the information contained in the memory card can be processed by anyone.

According to the invention, this aim can be achieved in such a way that the content of the memory card can be encrypted by means of a password, such as an IMEI code (International Mobile Equipment Identity), wherein the memory card can only be used in a device with the correct IMEI code. Thus, this protection can be removed in the device in question, wherein the content of the memory card can also be read in another device. Alternatively, the content of the memory card can be encrypted by means of a password in such a way that the correct password must be entered for processing the information contained in the memory card. Also in this case, the encryption can be removed by means of the password, wherein the memory card can be used without a password.

More precisely, the memory card according to the invention is characterized in what will be presented in the characterizing part of claim 1. The electronic device according to the invention is characterized in what will be presented in the characterizing part of claim 7. Furthermore, the method according to the invention is characterized in what will be presented in the characterizing part of claim 13.

Significant advantages are achieved by the present invention when compared with solutions of prior art. If the memory card is stolen or it is lost, no-one can process the information contained in the memory card without the password or the electronic device with the correct IMEI code. On the other hand, protection can be removed from the memory card, wherein the memory card can be inserted in any electronic device and any person can process the information contained in the memory card.

Figure 2:
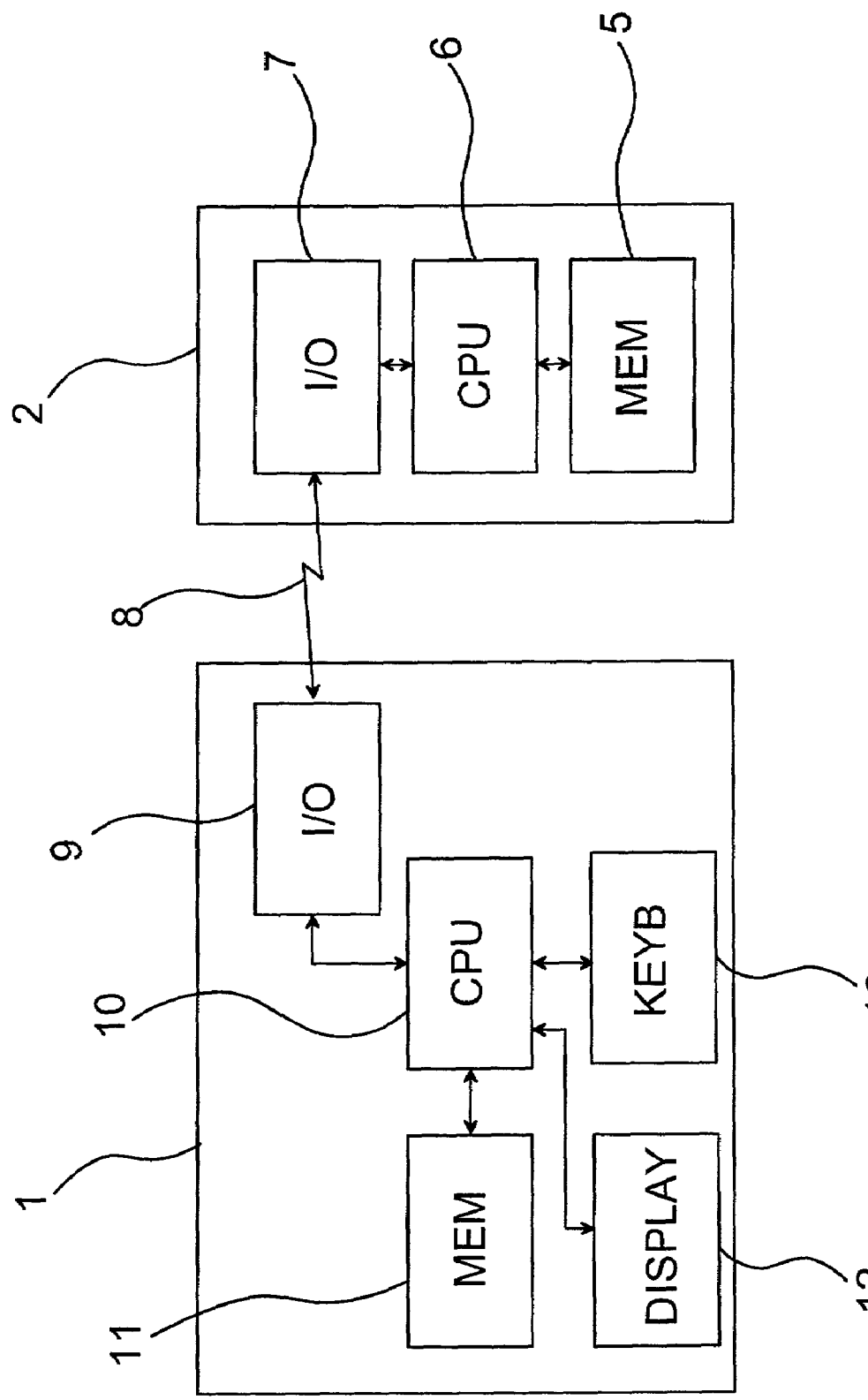

In the following, the invention will be described in more detail with reference to the appended drawings, in which FIG. 1 shows two electronic devices and a memory card, and FIG. 2 shows an electronic device and a memory card in a reduced block chart.

There are a number of various memory cards. For example, a multimedia memory card MMC is a data storage and communication card type developed by the international Multimedia Card Association. Such a memory card 2 (FIG. 2) preferably comprises at least memory means 5, control means 6, as well as first bus interface means 7 for coupling the card to an electronic device. Communication between the multimedia memory card and the electronic device 1 is based on serial data transmission. In this description, a memory card of this type will be used as an example, but it is naturally obvious that the invention can also be applied in the case of other types of memory cards.

The electronic device 1 preferably comprises at least a processor 10, memory means 11, and second bus interface means 9. Furthermore, the electronic device can comprise e.g. a display 12 and a keypad 13. In this electronic device 1 according to a preferred embodiment of the invention, communication between the first bus interface means 7 and the second bus interface means 9 is arranged to take place by means of a connection bus 8. In this example, this connection bus is a so-called serial connection bus, but it is obvious that the connection bus used can also be another known bus solution, such as a parallel bus or even a combined serial/parallel bus.

The encryption of the memory card 2 is preferably implemented in such a way that the information contained in the memory card cannot be read or processed if the password used for locking the memory card is not available. The memory card is preferably encrypted so that when the memory card is taken into use and formatted, a password is simultaneously set for the memory card, whereby the information contained in the memory card at the time can be encrypted and decrypted. This password is always used when information contained in the memory card is read or processed. The password is preferably entered by using the display 12 and keypad 13 of the electronic device. It is also possible that the password must only be entered when information contained in the memory card is read or processed for the first time in the electronic device 1 in question. At this first time, the memory card is decrypted, and after this, the password entered and stored in the memory 11 of the electronic device will be used for processing the information contained in the memory card, until the memory card is encrypted again, i.e. the password is deleted from the memory 11 of the electronic device.

The encryption of the memory card 2 is preferably automatical for example every time when the electronic device 1 is turned off, its battery 3 (FIG. 1) is removed, there is not enough voltage in the battery, the electronic device is locked, and/or the memory card is removed from the memory card slot 4 of the electronic device. The password must be re-entered for decryption. To keep the memory card encrypted after the above-mentioned situations, the information contained in the memory card is preferably continuously in encrypted format. Thus, the memory card is advantageously decrypted in such a way that when information is read from the memory card, the desired information is retrieved from the memory card in encrypted format to the memory 11 of the electronic device, and the processor 10 decrypts the encrypted information by means of the password. In a corresponding manner, when writing on the memory card, the information to be written is encrypted in the electronic device by means of the password and written in encrypted format on the memory card. The memory card is advantageously encrypted by deleting the password in use from the memory 11 of the electronic device or by turning off the electronic device, wherein the used password is deleted from the memory of the electronic device.

In a situation in which the content of the memory card 2 has been or is being stored by means of a password by scrambling into different locations in the memory of the memory card, encryption and decryption are performed in a slightly different way from that described above. Thus, when information is being written on the memory card, the processor of the electronic device preferably generates, by means of the password, several memory addresses to indicate locations in the memory of the memory card into which the information to be stored will be scrambled. In a corresponding manner, for reading some information from the memory of the memory card, the processor 10 forms the memory addresses indicating locations in the memory of the memory card from which the information to be read will be collected for reading. This embodiment has e.g. the advantage that encryption and decryption do not slow down the operation of the memory card 2. Although in this embodiment, the information as such is not in encrypted format on the memory card 2, the large number of memory address combinations (read/write) required by the scrambling in practice means that it is very difficult and even impossible to find out the stored information without the correct memory address combinations. Furthermore, in this embodiment, only part of the memory card 2 can be encrypted, if necessary.

Also, it is possible to remove encryption from the whole memory card 2 preferably after the memory card has been decrypted by means of the password. Thus, a command is given to the card which results in that the memory card will no longer be automatically encrypted in said situations. After this, the card can be read and processed without a password. The encryption is preferably removed e.g. by storing the password in the memory of the memory card, wherein this password is used for processing information contained in the memory card. In an encrypted memory card, this password is naturally not stored in the location reserved for it. Another advantageous alternative for removing the encryption is to store all the information contained in the memory card in unencrypted format, wherein the memory card preferably contains at least one register in which information is stored on whether the information contained in the memory card is in encrypted or unencrypted format. This register can also be located in the memory of the memory card.

The password of the memory card 2 is preferably replaced in such a way that first the encryption of the memory card is removed by entering the password, after which a new password is given for the memory card. After this operation, the processor 10 of the electronic device encrypts the information contained in the memory card by means of the new password. After replacement of the password, the memory card can be preferably decrypted by means of the new password only.

Another alternative for encrypting the memory card 2 is to use the IMEI code of the electronic device 1, such as a wireless communication device, as the above-mentioned password. Thus, the memory card can only be read in the electronic device with the correct IMEI code. This authenticity can be preferably controlled in such a way that the memory card can only be decrypted with the correct IMEI code. The memory card cannot be decrypted with an incorrect IMEI code.

Also in this alternative, the memory card is preferably encrypted for example each time when the electronic device is turned off, its battery 3 is removed, the battery has not enough voltage, the electronic device is locked, and/or when the memory card is removed from the memory card slot 4 of the electronic device. To keep the memory card encrypted after the above-mentioned situations, the information contained in the memory card is preferably continuously in encrypted format. Thus, the memory card is preferably decrypted in such a way that when information is being read from the memory card, the desired information is retrieved from the memory card in encrypted format to the memory 11 of the electronic device, and the processor 10 of the electronic device decrypts it by means of the IMEI code. In a corresponding manner, when writing onto the memory card, the processor 10 encrypts the information to be written by means of the IMEI code in the electronic device, and the information is written in encrypted format onto the memory card. When the IMEI code is used for encrypting the memory card, the memory card does not actually be encrypted in the above-mentioned situation, because the information contained in the memory card is in encrypted format all the time. Furthermore, when the memory card is transferred from a first electronic device 1a to a second electronic device 1b, the information contained in the memory card cannot be read or processed, because the IMEI code is incorrect.

In a situation in which the content of the memory card 2 is stored in different locations of the memory of the memory card, scrambled by means of the IMEI code of the electronic device 1, encryption and decryption are performed in a slightly different way from that presented above. Thus, when information is being written onto the memory card, the processor 10 generates, by means of the IMEI code of the electronic device, preferably several memory addresses which indicate locations in the memory of the memory card where the information to be stored is scrambled. In a corresponding manner, for reading some information from the memory of the memory card, the processor 10 uses the IMEI code to form the memory addresses which indicate the locations in the memory of the memory card from where the information to be read is collected for reading.

The decryption of the memory card 2 in such a way that the memory card can also be used in other electronic devices 1b is preferably performed in the first electronic device 1a whose IMEI code was used to encrypt the memory card. After this decryption, the memory card can be taken into use in another electronic device 1b. After the memory card has been transferred to another electronic device, the memory card can be preferably encrypted by means of the IMEI code of this second electronic device in such a way that after this, the memory card can only be used in this second electronic device 1b.

The encryption is preferably removed e.g. by storing in the memory of the memory card 2 the IMEI code of the first electronic device 1a by which this memory card has been protected. Thus, this stored IMEI code is used for processing information contained in the memory card. This IMEI code is naturally not stored in an encrypted memory card. Another advantageous alternative for removing the encryption is to store all the information contained in the memory card in unencrypted format, wherein the memory card preferably comprises at least one register in which information is stored on whether the information contained in the memory card is in encrypted or unencrypted format.

It is also possible that the encryption of the memory card is implemented in such a way that the memory card can be transferred from a first electronic device 1a whose IMEI code has been used to encrypt the memory card, to a second electronic device 1b, the memory card being encrypted. Thus, for decrypting the memory card, a password is transmitted to this second electronic device e.g. by means of a text message or by entering the password by means of the display 12 and the keypad 13 of the electronic device, wherein information contained in the memory card can be processed in this second electronic device 1b. Alternatively, after the transmission of this password, the memory card is encrypted with the IMEI code of the second electronic device, wherein the memory card can only be used in this second electronic device. This password to be transmitted is preferably different from the IMEI code of the first electronic device 1a. Further, this password is preferably long and difficult to guess, because it is only used in exceptional situations instead of the IMEI code of the electronic device.

The possibility to decrypt the memory card 2 also by means of a password instead of the IMEI code further increases user-friendliness. For example, if the first electronic device 1a in which the memory card is set to function, is broken in such a way that it cannot be used to process the memory card, the memory card can still be used. Thus, the memory card is preferably transferred from the broken first electronic device 1a to an unbroken second electronic device 1b in which the memory card can be taken into use by means of the password.

In the above-described situations, the memory card 2 is encrypted by using an encryption method in which encryption and decryption are performed by using the same password. By means of this password, it is possible e.g. to scramble information to be stored on the memory card in different locations of the memory space on the memory card, wherein the content of the memory card seems fully random, but it can be read by means of the password. Another alternative is to use an encryption method applying a password and known as such, for encrypting the information contained in the memory card. It is naturally obvious that the memory card can also be encrypted by using a method in which the memory card is encrypted and decrypted by using different passwords. However, these passwords are then dependent on each other. It is also possible to increase the level of encryption by using a combination of the IMEI code of the electronic device 1 and a password for encrypting the memory card, wherein when anyone seizes the IMEI code or the password, the memory card can, however, not be decrypted. It is also possible that if anyone seizes the IMEI code and the password, he/she will not be able to encrypt the memory card, because he/she does not know how the decryption key is formed of the IMEI code and the password.

The present invention is not limited solely to the embodiments presented above, but it can be modified within the scope of the appended claims.

The invention claimed is:

1. An electronic device comprising:
a memory having computer-readable instructions stored therein which are programmed to generate a pseudo-random sequence of memory addresses using a password, each memory address addressing a memory location of a memory card; to divide information into a plurality of segments; to select a first address of the pseudo-random sequence of memory addresses; to select a first segment of the plurality of segments; (a) to store the selected first segment in the selected first address; and (b) to repeat (a) with a next address of the pseudo-random sequence of memory addresses selected as the first address and with a next segment of the plurality of segments selected as the first segment until the plurality of segments are stored in the memory card, so that consecutive parts of the information are stored in non-consecutive memory locations addressed by the pseudo-random sequence of memory addresses; and
a processor, the processor electronically coupled to the memory and configured to execute the instructions.

2. The electronic device according to claim 1, further comprising a memory card, the memory card comprising memory locations for storing the information, said memory locations being addressable by memory addresses.

3. The electronic device according to claim 1, characterized in that it is a wireless communication device.

4. The electronic device according to claim 1, wherein the computer-readable instructions are further programmed to store the password in the memory of the memory card.

5. The electronic device according to claim 1, wherein the password is the International Mobile Equipment Identity code of the electronic device.

6. The electronic device according to claim 1, wherein a password is formed at least partly of the International Mobile Equipment Identity code of the electronic device.

7. The electronic device according to claim 1, wherein the computer-readable instructions are further programmed the pseudo-random sequence of memory addresses to retrieve information stored in the memory locations.

8. The electronic device of claim 1, wherein the computer-readable instructions are further programmed:
   to use the password to encrypt the selected first segment before storing the selected first segment in the selected first address.

9. The electronic device according claim 1, wherein the password is stored in the memory.

10. A method for protecting a memory card comprising memory locations for storing information, said memory being addessable by memory addresses, the method comprising:
   (a) generating a pseudo-random sequence of memory addresses using a password, the memory addresses addressing in memory locations of a memory card;
   (b) dividing information to store on the memory card into a plurality of segment;
   (c) selecting a first address of the generated pseudo-random sequence of memory addresses;
   (d) selecting a first segment of the plurality of segments;
   (e) storing the selected segment in the selected first address; and
   (f) repeating (e) with a next address of the pseudo-random sequence of memory address selected as the first address and with a next segment of the plurality of segments selected as the first segment until the plurality of segments are stored in the memory card.

11. The method according to claim 10, wherein the information stored on the memory card is at least partly encrypted.

12. The method according to claim 10, wherein the password is stored in the memory card.

13. The method according to claim 10, wherein the password is the International Mobile Equipment Identity code of the electronic device.

14. The method according to claim 10, wherein the password is formed at least partly of the International Mobile Equipment Identity code of the electronic device.

15. The method according to claim 10 further comprising using the password to define the pseudo-random sequence of memory addresses to retrieve the information from the memory locations of the memory card.

16. The method of claim 10 further comprising:
   encrypting the selected first segment using the password before storing the selected first segment in the selected first address.

17. The method according to claim 16 further comprising:
   decrypting the retrieved information using the password.

18. A memory card comprising:
   memory locations for storing information;
   a controller configured to receive information to be stored in the memory card, the controller further configured to store the received information;
   each part of the received information being assigned to a memory location of the memory locations based on a pseudo-random sequence of non-consecutive memory addresses generated using a password.

19. The memory card according to claim 18, wherein the information stored on the memory card is at least partly in encrypted format.

20. The memory card according to claim 18, wherein the password is stored in a memory of the memory card.

21. The memory card according to claim 18, wherein the password is a International Mobile Equipment Identity code.

22. The memory card according to claim 18, wherein the password is formed at least partly of a International Mobile Equipment Identity code.

23. The memory card of claim 18 wherein the received information is encrypted using the password.

24. A computer-readable medium including computer-readable instructions that upon execution by a processor, cause the processor to protect a memory card comprising memory locations for storing information, the memory locations addressable by memory addresses, the instructions configured to cause a computing device to:
   (a) generate a pseudo-random sequence of memory addresses using a password, the memory addresses addressing memory locations of memory card;
   (b) divide information to store on the memory card into a plurality of segments:
   (c) select a first address of the generated pseudo-random sequence of memory addresses;
   (d) select a first segment of the plurality of segments;
   (e) store the selected first segment in the selected first address; and
   (f) repeat (e) with a next address of the pseudo-random sequence of memory addresses selected as the first address and with a next segment of the plurality of segments selected as the first segment until the plurality of segments are stored in the memory card.

25. The computer-readable medium of claim 24 wherein the instructions are further configured to store the password in a memory location of the memory card.

26. The computer-readable medium of claim 24 wherein the instructions are further configured to store the password in a memory location of a wireless communication device.

27. The computer-readable medium of claim 24, wherein the password is an International Mobile Equipment Identity code of a wireless communication device.

28. The computer-readable medium of claim 24, wherein the password is formed at least partly of an International Mobile Equipment Identity code of a wireless communication device.

29. The computer-readable medium of clam 24, wherein the instructions are further configured to encrypt the selected first segment using the password before storing the selected first segment in the selected first address.

30. The computer-readable medium of claim 24, wherein the instructions are further configured to generate the pseudo-random sequence of memory addresses using the password to retrieve the information stored in them memory locations of the memory card.

31. The computer-readable medium of claim 30, wherein the instructions are further configured to decrypt the retrieved the information using the password.

* * * * *